(12) United States Patent
Odaka et al.

(10) Patent No.: US 9,595,908 B2
(45) Date of Patent: Mar. 14, 2017

(54) POWER CONVERTER

(71) Applicant: FUJI ELECTRIC CO., LTD., Kawasaki-shi (JP)

(72) Inventors: Akihiro Odaka, Hino (JP); Akio Toba, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/846,571

(22) Filed: Sep. 4, 2015

(65) Prior Publication Data

US 2015/0381101 A1 Dec. 31, 2015

Related U.S. Application Data

(63) Continuation of application No. PCT/JP2014/050392, filed on Jan. 14, 2014.

(30) Foreign Application Priority Data

Apr. 1, 2013 (JP) ................................. 2013-075596

(51) Int. Cl.
  *G05D 23/275* (2006.01)
  *H02P 29/00* (2016.01)
  *H02M 1/32* (2007.01)

(52) U.S. Cl.
  CPC .......... *H02P 29/0088* (2013.01); *H02P 29/68* (2016.02); *H02M 2001/327* (2013.01)

(58) Field of Classification Search
  CPC ....... H02P 29/60; H02P 29/0044; H02P 29/68
  USPC ....................................................... 318/634
  See application file for complete search history.

(56) References Cited

U.S. PATENT DOCUMENTS

| 6,114,828 A | 9/2000 | Matsunaga et al. |
| 7,755,313 B2* | 7/2010 | Son ........................... B60L 3/06 318/432 |
| 8,354,813 B2* | 1/2013 | Hasegawa ........... H02P 29/0088 318/432 |
| 2007/0252548 A1* | 11/2007 | Moon .................. H02P 29/0088 318/434 |

(Continued)

FOREIGN PATENT DOCUMENTS

| JP | H10-210790 A | 8/1998 |
| JP | 3075303 B2 | 8/2000 |

(Continued)

OTHER PUBLICATIONS

Takahisa Hitachi et al., "Direct Liquid Cooling IGBT Module for Automotive Applications", Fuji Electric Review, vol. 58, No. 2, 2012, pp. 55-59.

*Primary Examiner* — Bentsu Ro
*Assistant Examiner* — Bickey Dhakal
(74) *Attorney, Agent, or Firm* — Rabin & Berdo, P.C.

(57) ABSTRACT

A method for a power conversion apparatus to drive an electric motor using a power semiconductor device. The method includes detecting or estimating a temperature of the power semiconductor device to thereby obtain a detected or estimated temperature value, adjusting a torque command of the electric motor, so that the temperature of the power semiconductor device matches a preset temperature when the detected or estimated temperature value is equal to or higher than the preset temperature, and controlling the power semiconductor device using the adjusted torque command.

4 Claims, 16 Drawing Sheets

(56) References Cited

U.S. PATENT DOCUMENTS

2009/0072770 A1    3/2009   Son et al.
2010/0320951 A1   12/2010   Hasegawa et al.

FOREIGN PATENT DOCUMENTS

| JP | 2002-051568 A | 2/2002 |
|----|---------------|--------|
| JP | 2008-092688 A | 4/2008 |
| JP | 2009-017707 A | 1/2009 |
| JP | 2009-290929 A | 12/2009 |
| JP | 2011-097672 A | 5/2011 |

* cited by examiner

POWER CONVERTER

CROSS-REFERENCE TO RELATED APPLICATIONS

This application is a continuation application under 35 U.S.C. 120 of International Application PCT/JP2014/050392 having the International Filing Date of Jan. 14, 2014, and claims the priority of Japanese Patent Application No. JP PA 2013-075596, filed on Apr. 1, 2013. The identified applications are fully incorporated herein by reference.

BACKGROUND OF THE INVENTION

Technical Field

The present invention relates to a power conversion apparatus having a function of protecting power semiconductor devices such as semiconductor switching devices that form the power conversion apparatus from an overheating accident.

Background Art

Patent Literature 1 (Japanese Patent No. 3075303, in, e.g., paragraph [0006], FIG. 2, and the like) and Patent Literature 2 (Japanese Patent Application Publication No. 2009-17707, in, e.g., paragraphs [0048] to [0052], FIG. 1, FIG. 11, and the like) disclose related arts of a power conversion apparatus for variable velocity driving of electric motors in which a power semiconductor device such as a semiconductor switching device is mounted. The power conversion apparatus limits current flowing into a semiconductor device before the temperature of the semiconductor device exceeds an allowable temperature to destroy the semiconductor device, to thereby protect the semiconductor device and the power conversion apparatus from an overheating accident.

FIG. 9 is a block diagram associated with overheat protection of a semiconductor device disclosed in Patent Literature 1, and FIG. 10 is a diagram for describing the operation thereof.

In FIG. 9, reference numeral 100 designates a rectifying circuit connected to a three-phase AC power supply, 200 designates an inverter having semiconductor switching devices 201 to 206, and 300 designates an electric motor driven by the inverter 200. Reference numeral 400 designates a control device, 401 designates a current detector, 402 designates a PWM (pulse-width modulation) control unit, and 403 designates a thermistor. Reference numeral 404 designates a temperature detecting unit, 405 designates a junction temperature estimating unit, 406 and 407 are subtractors that calculate differences between preset temperatures 1 and 2 and a junction temperature $T_j$, respectively. Reference numeral 408 designates an operational amplifier, 409 designates a current limiting function, and 410 designates a comparator. Reference numeral 411 designates a current blocking function, and 412 designates a base driver that drives switching devices 201 to 206.

In this related art, the junction temperature estimating unit 405 estimates the temperature (the junction temperature) of a switching device and limits or blocks an output current by such a current limiting rate as illustrated in FIG. 10 when the estimated temperature exceeds preset temperatures 1 and 2 ($T_0$, $T_1$) to thereby protect the switching device from overheating. In this related art, since an algorithm for estimating the junction temperature is not directly related to the present invention, description thereof will not be provided.

FIG. 11 is a block diagram associated with overheat protection (a block diagram of a motor control device) of a semiconductor device disclosed in Patent Literature 2, and FIG. 12 is a flowchart illustrating the operation thereof.

In FIG. 11, reference numeral 501 designates a torque limit value calculating unit that calculates a torque limit value based on a target torque and the outputs of a rotation number calculating unit 507 and a highest temperature extracting unit 510. Reference numeral 502 designates a torque-current converting unit that calculates a d-axis current command value $i_{dr}$ and a q-axis current command value $i_{qr}$ from the torque limit value. Reference numeral 503 designates a current control unit that calculates a d-axis voltage command value $v_{dr}$ and a q-axis voltage command value $v_{qr}$ from deviations between the d-axis current command value $i_{dr}$ and the q-axis current command value $i_{qr}$ and a d-axis current $i_d$ and a q-axis current $i_q$ output from a coordinate transforming unit 508, respectively. Reference numeral 504 designates an inverse coordinate transforming unit that transforms the d-axis voltage command value $v_{dr}$ and the q-axis voltage command value $v_{qr}$ to three-phase voltage command values. Reference numeral 505 designates an inverter control unit that generates a drive signal (gate signal) to be supplied to each of switching devices of the inverter 506 based on the three-phase voltage command values. Reference numeral 301 designates a three-phase motor driven by the inverter 506. Reference numeral 507 designates a rotation number calculating unit that calculates the number of rotations of the motor 301. Reference numeral 508 is a coordinate transforming unit that detects current components of respective phase coils of the motor 301 and transforms the current components to the d-axis current $i_d$ and the q-axis current $i_q$, respectively. Reference numeral 509 designates a device temperature estimating unit that estimates the temperature of each of the switching devices of the respective phases of the inverter 506 from the current components of the respective phase coils of the motor 301 and the measured temperature value of the inverter 506 before rotation of the motor. Reference numeral 510 designates a highest temperature extracting unit that extracts a highest temperature from the input estimated temperature values.

In this related art, in the processes of steps S11 to S16 in FIG. 12, when a highest temperature is extracted from the estimated temperatures of the switching devices of the respective phases of the inverter 506, and the highest temperature is smaller than a predetermined temperature threshold, the current is controlled in the processes of steps S18 to S21 so that the motor 301 is driven by the inverter 506.

Moreover, when the highest temperature exceeds the temperature threshold (step S17: NO), the torque of the motor 301 is corrected so as to decrease the torque (S22) to thereby decrease the generation loss of the switching devices to realize overheat protection.

In the torque correction step (S22), a torque limiting amount is determined in advance according to a difference between an estimated temperature value and a temperature threshold, for example, and a torque command value is decreased by a ratio proportional to the difference between the estimated temperature value and the temperature threshold.

However, in Patent Literature 1 described above, as obvious from FIG. 9, a current that flows actually is limited by limiting the current command of an electric motor, and semiconductor devices are protected from overheating. However, in a control system for controlling an electric motor, if the current command is limited directly, this may interfere with control of the electric motor. Thus, the control of the electric motor may become unstable and it may become difficult to realize both overheat protection and stable control of the electric motor during the overheat protection. This will be described briefly below.

FIG. 13 is a control block diagram of a permanent magnet synchronous electric motor disclosed in Patent Literature 3 (Japanese Patent Application Publication No. 2009-290929, in, e.g., paragraphs [0013] to [0026], FIG. 1, FIG. 2, and the like) and FIG. 14 is a block diagram illustrating a configuration of a current command calculating unit 603 in FIG. 13. According to this related art, it is possible to utilize a reactance torque of a permanent magnet-type synchronous electric motor such as an embedded magnet-type synchronous electric motor and to generate a desired torque stably with a minimum necessary (that is, smallest) current.

Hereinafter, Patent Literature 3 will be described briefly with reference to FIGS. 13 and 14, and then the problem of Patent Literature 1 will be described.

First, the control block diagram of FIG. 13 illustrates the functions for controlling the velocity of an electric motor. A subtractor 601 calculates a deviation between a velocity command $\omega^*$ and a detected velocity value $\omega_1$ of an electric motor 302, and a velocity regulator 602 adjusts a torque command $\tau^*$ according to the deviation so as to obtain a desired rotating velocity.

Subsequently, the current command calculating unit 603 calculates d- and q-axis current commands $i_d^*$ and $i_q^*$ obtained by rotationally transforming the coordinates of the current flowing in the electric motor 302. Here, as described above, in order to output a largest torque with a smallest current, the current command calculating unit 603 calculates optimal d- and q-axis current commands $i_d^*$ and $i_q^*$ by taking the detected velocity value $\omega_1$ and the output (voltage limit value) $v_{alim}$ of a voltage limit value calculator 612 based on a detected DC voltage value $E_{dc}$ output from a voltage detecting unit 611 into consideration.

Under d- and q-axis voltage commands $i_d^*$ and $i_q^*$, subtractors 604d and 604q and d- and q-axis current regulators 605d and 605q calculate d- and q-axis voltage commands $v_d^*$ and $v_q^*$ so that the values $i_d$ and $i_q$ obtained by a current coordinate transformer 614 rotationally transforming the coordinates of detected current values $i_u$ and $i_w$ (and $i_v$) detected by current detectors 613u and 613w become the d- and q-axis current command values $i_d^*$ and $i_q^*$.

A voltage coordinate transformer 606 transforms the d- and q-axis voltage commands $v_d^*$ and $v_q^*$ to U-, V-, and W-phase voltage commands $v_u^*$, $v_v^*$, and $v_w^*$ and transmits the voltage commands to a PWM circuit 607. The PWM circuit 607 performs PWM control while taking the DC voltage $E_{dc}$ into consideration to generate gate signals of semiconductor switching devices that form a power converter 610 such as an inverter.

Reference numeral 608 designates a three-phase AC power supply, 609 designates a rectifying circuit, 615 designates a pole position detector, and 616 designates a velocity detector.

Moreover, as illustrated in FIG. 14, in the current command calculating unit 603, a magnetic flux command value $\psi^*$ and a load angle command value $\delta^*$ are calculated by the operations of a magnetic flux command calculator 603a, a load angle command calculator 603b, a load angle regulator 603d, a magnetic flux limit value calculator 603e, an output limiter 603f, a torque calculator 603j, a subtractor 603c, an adder 603g, and the like. Moreover, the d- and q-axis current commands $i_d^*$ and $i_q^*$ are calculated by a current command calculator 603h.

The torque calculator 603j calculates an output torque $\tau$calc of the electric motor based on the d- and q-axis current commands $i_d^*$ and $i_q^*$ calculated by the current command calculator 603h, and the calculated torque value $\tau$calc is fed back so that the load angle $\delta^*$ is adjusted so as to match a torque command $\tau^*$. In particular, when the voltage necessary for the power converter 610 in FIG. 13 to drive the electric motor 302 is not sufficient, the load angle regulator 603d operates to limit the magnetic flux inside the electric motor 302 based on a calculation result obtained by a magnetic flux limit value calculator 603e.

By using such a control method, it is possible to utilize the reactance torque of a permanent magnet-type synchronous electric motor such as an embedded magnet-type synchronous electric motor and to control the velocity of the electric motor with a desired torque and a smallest current stably.

FIG. 13 is a control block diagram for controlling the velocity of the electric motor 302 as described above. Depending on an apparatus to which the electric motor is applied, simple torque control may be performed. In this case, the torque command $\tau^*$ is input directly from the outside instead of using the velocity regulator 602 in FIG. 13.

As described above, in Patent Literature 3, optimal d- and q-axis current commands $i_d^*$ and $i_q^*$ are calculated based on the torque command $\tau^*$ of the electric motor 302, the output of the power converter 610, and the like.

However, if a current limiting unit for protecting a semiconductor device from overheating is provided at the subsequent stage of the current command calculator 603h in FIG. 14, for example, using the technique disclosed in Patent Literature 1 so as to just limit the magnitude of the output current value (to limit the magnitude of any one or both of the d-axis current command $i_d^*$ and the q-axis current command $i_q^*$), the control method described in FIG. 14 and the overheat protection method may interfere and it may be difficult to control the electric motor 302 stably.

In order to obviate this problem, although the control method described in FIG. 14 may be modified for improvement, the improved control method may become complex and the control device may become expensive.

Next, the problem of the related art disclosed in Patent Literature 2 will be described.

According to Patent Literature 2, overheating of a switching device can be prevented by decreasing the torque command value. Thus, when this technique is applied to the related art of Patent Literature 3, the value $\tau^*$ described in FIG. 14 may be decreased.

However, the torque decrease amount calculating unit disclosed in Patent Literature 2 has the following problem.

The temperature of a semiconductor device will be described before describing the problem of Patent Literature 2 is described in detail.

FIGS. 15 and 16 are examples of simulation results of a temperature rise value and the like of a semiconductor device in relation to a coolant. A power semiconductor module used in this simulation is a direct liquid cooling-type power semiconductor module disclosed in Non-Patent Literature 1 ("Direct Liquid Cooling IGBT Module for Automotive Applications," Fuji Electric Review, Vol. 84, No. 5, pages 308-312, 2011) described later. Here, a direct liquid cooling system is a system in which heat generated by the power semiconductor module is dissipated directly to cooling water as a coolant, and the details thereof are disclosed in Non-Patent Literature 1. The absolute temperature of the semiconductor device in such a power semiconductor module is an addition of the temperature rise value described in FIGS. 15 and 16 and a coolant temperature.

FIGS. 15 and 16 illustrate simulation results of an electric motor current $i_u$ [A] when a certain electric motor as a control target of a power conversion apparatus outputs a certain torque trq [N·m], a generation loss T_UP_LOSS [W] of a certain semiconductor device among a plurality of semiconductor devices that form the power conversion apparatus, and a temperature rise value T_UP_TJW [K] of the semiconductor device in relation to the coolant. The difference between both figures is an output frequency as an operation condition. As obvious from FIGS. 15 and 16, since the same torque is generated even if the output frequency is different, the amplitude of a current flowing in the electric motor and the generation loss are the same under both conditions.

However, FIG. 15 in which the output frequency is lower than the other figure shows a higher temperature rise value T_UP_TJW of the semiconductor device in relation to the coolant. This is because, although the average temperature of both cases is the same since a relaxation time is present between the generation loss of the semiconductor device and the temperature rise associated therewith, and because the lower the output frequency, the higher the spontaneous temperature becomes.

BRIEF SUMMARY OF THE INVENTION

From the above description, it can be understood that, when a coolant temperature rises due to abnormality or the like in a cooling system and it is necessary to protect a semiconductor device from overheating in a power conversion apparatus formed of an IGBT (insulated-gate bipolar transistor) module of the direct liquid cooling system described above, for example, a torque decrease amount is different depending on an operation state of the power conversion apparatus.

In contrast, as described above, Patent Literature 2 describes that a torque limiting amount is determined in advance according to a difference between an estimated temperature value and a preset temperature threshold, for example, and a torque command value is decreased by a ratio proportional to the difference between the estimated temperature value and the temperature threshold.

However, as described above, under such an operation condition that the output frequencies are different and the temperature rise values in relation to the coolant are different even if the occurring torque is the same, such a torque decreasing unit as disclosed in Patent Literature 2 may be unable to realize overheat protection reliably. Moreover, the torque command value decrease amount may be set to be large in advance. In this case, however, the torque may be decreased more than necessary depending on an operation state of the power conversion apparatus, and as a result, the power conversion apparatus maybe overprotected.

Therefore, the present invention provides a power conversion apparatus capable of preventing interference with a control system and protecting a semiconductor device from overheating appropriately and reliably without limiting the torque of an electric motor more than necessary.

In order to solve the problems of conventional apparatuses, the present invention provides a power conversion apparatus such as an inverter for driving an electric motor, including: a power semiconductor device; a control unit that controls the semiconductor device, based on an torque command of the electric motor; and a semiconductor temperature detecting/estimating unit that detects or estimates a temperature of the semiconductor device.

The present invention is characterized in that the power conversion apparatus of the present invention further includes a torque command adjusting unit that adjusts the torque command so that the temperature of the semiconductor device matches a preset temperature when a detected temperature value or an estimated temperature value of the semiconductor device, obtained by the semiconductor temperature detecting/estimating unit is equal to or higher than the preset temperature for performing overheat protection of the semiconductor device.

Here, the torque command adjusting unit includes: a regulating unit that operates to eliminate a deviation between the preset temperature and the detected temperature value or the estimated temperature value and a proportional regulator and an integral regulator; and a torque correction amount limiting unit that limits a torque correction amount output from the regulating unit so that the torque correction amount does not increase an absolute value of the torque command, and the torque command is corrected using the torque correction amount limited by the torque correction amount limiting unit.

The regulating unit may further include a differential regulator.

As a torque command correction method in the torque command adjusting unit, the torque correction amount may be added to the torque command as a decrease amount, and the torque correction amount may be multiplied by the torque command as a decrease rate.

In the present invention, in order to perform desired overheat protection during driving or braking, the torque command adjusting unit may include a polarity reversing unit that reverses a polarity of the torque correction amount according to a polarity of the torque command.

Further, the torque command adjusting unit may include a lower limit setting unit that sets a lower limit of the torque correction amount limiting unit, using an absolute value of the torque command.

In this case, an upper limit of the torque correction amount limiting unit may be set to zero.

Alternatively, the torque command adjusting unit may further include an integral regulator limiting unit that limits an output of the integral regulator, and an upper limit of an output of the integral regulator limiting unit may be set to a difference between zero and an output of the proportional regulator, and a lower limit of the output of the integral regulator limiting unit maybe set to a difference between a lower limit of the torque correction amount limiting unit and the output of the proportional regulator.

The torque command adjusting unit may further include: an integral regulator limiting unit that limits an output of the integral regulator; and an integral regulator operation adjusting unit that allows or stops an operation of the integral regulator, based on a deviation between the preset temperature and the detected temperature value or the estimated temperature value, and an output of the torque correction amount limiting unit. Moreover, a lower limit of an output of the integral regulator limiting unit may be set to a difference between a lower limit of the torque correction amount limiting unit and an output of the proportional regulator.

In this case, the integral regulator operation adjusting unit may allow the operation of the integral regulator when the detected temperature value or the estimated temperature value is equal to or higher than the preset temperature; may stop the operation of the integral regulator and clear the output of the integral regulator to zero when the detected temperature value or the estimated temperature value is lower than the preset temperature and the torque correction amount limited by the torque correction amount limiting unit is a value that does not decrease the absolute value of the torque command; and continue the operation of the integral regulator in other cases.

According to the present invention, a torque command of an electric motor is adjusted according to a deviation between a detected semiconductor temperature value or an estimated temperature value and a preset temperature. By doing so, it is possible to prevent interference with a control system of the electric motor and to protect a semiconductor device that forms a power converter from overheating appropriately and reliably without limiting the torque of an electric motor more than necessary.

DETAILED DESCRIPTION OF THE INVENTION

Hereinafter, embodiments of the present invention will be described with reference to the drawings.

Figure 1:
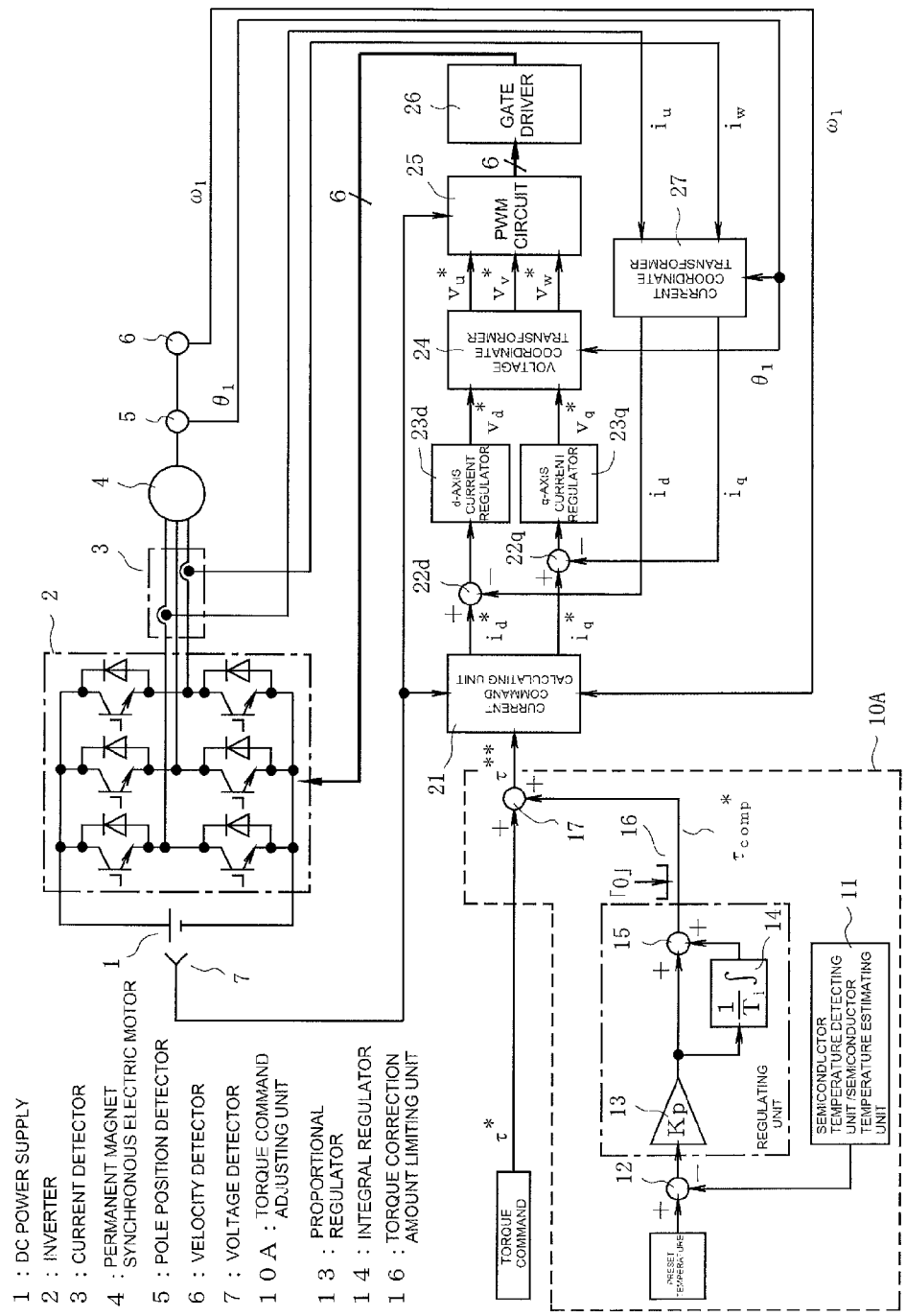
FIG. 1 is a block diagram illustrating a first embodiment of the present invention.

First, FIG. 1 is a block diagram illustrating a first embodiment of the present invention. In the respective embodiments subsequent to the first embodiment, a power conversion apparatus is formed of a two-level inverter which uses six semiconductor switches each obtained by connecting an IGBT as a power semiconductor switching device and a diode in reversely parallel to each other and a permanent magnet synchronous electric motor is driven by the inverter.

Here, the power conversion apparatus is not limited to the two-level inverter as illustrated in the drawing, and an electric motor driven by the power conversion apparatus is not limited to the permanent magnet synchronous electric motor.

In FIG. 1, reference numeral 1 designates a DC (direct current) power supply, 2 designates an inverter connected to the DC power supply 1, 3 designates a current detector that detects an output current (the current of an electric motor 4 described later) of the inverter 2, 4 designates a permanent magnet synchronous electric motor, 5 designates a pole position detector attached to the electric motor 4, 6 designates a velocity detector, and 7 designates a voltage detector that detects the voltage of the DC power supply 1.

A control unit of the inverter 2 is configured similarly to that disclosed in Patent Literature 3 described above. The control unit of the inverter 2 includes a current command calculating unit 21 that calculates d- and q-axis current commands $i_d^*$ and $i_q^*$ based on a torque command $\tau^{**}$, a detected DC voltage value, and a detected velocity value, subtractors 22$d$ and 22$q$ that calculate deviations between the d- and q-axis current commands $i_d^*$ and $i_q^*$ and the d- and q-axis current $i_d$ and $i_q$, respectively, d- and q-axis current regulators 23$d$ and 23$q$ that output such d- and q-axis voltage commands $v_d^*$ and $v_q^*$ as to make these deviations zero, respectively, a voltage coordinate transformer 24 that transforms the d- and q-axis voltage commands $v_d^*$ and $v_q^*$ to three-phase voltage commands $v_u^*$, $v_v^*$, and $v_w^*$ by coordinate transformation using a detected pole position value (phase angle) $\theta_1$, a PWM circuit 25 that generates a PWM signal based on the voltage commands $v_u^*$, $v_v^*$, and $v_w^*$ and a detected DC voltage value, a gate driver 26 that generates a gate signal for a semiconductor switching device of the inverter 2 based on the PWM signal, and a current coordinate transformer 27 that generates d- and q-axis current $i_d$ and $i_q$ by coordinate transformation using $\theta_1$ from the detected current values $i_u$ and $i_v$ (and $i_w$) obtained by the current detector 3.

Since the operation of the control unit is obvious from Patent Literature 3, description thereof will not be provided. Moreover, the configuration of the control unit is not limited to the example illustrated in FIG. 1.

Next, a configuration and an operation of a torque command adjusting unit 10A which is a main part of this embodiment will be described.

In the torque command adjusting unit 10A, a subtractor 12 calculates a deviation between a preset temperature of a semiconductor switching device (an allowable temperature before the semiconductor switching device is destroyed) and a detected semiconductor temperature value or an estimated semiconductor temperature value (hereinafter referred to simply as a semiconductor temperature) obtained by a semiconductor temperature detecting unit/semiconductor temperature estimating unit (hereinafter referred to simply as a semiconductor temperature detecting/estimating unit) 11. This deviation is input to a regulating unit that includes a proportional regulator 13, an integral regulator 14, and an adder 15. The output of the regulating unit, of which the upper limit is limited by a torque correction amount limiting unit 16, is used as a torque correction amount $\tau_{comp}^*$, and the original torque command $\tau^*$ is added thereto by the adder 17, whereby a final torque command $\tau^{**}$ of the electric motor 4 is calculated. In the following description, it is assumed that a proportional gain $K_p$ of the proportional regulator 13 is a positive value.

Moreover, in the following description, although an example in which the regulating unit includes the proportional regulator 13, the integral regulator 14, and the adder 15 has been described, a differential regulator or an equivalent regulator may be added thereto to form the regulating unit for the purpose of, for example, improving responsiveness to a steep change in temperature.

Here, with regard to how the semiconductor temperature detecting/estimating unit 11 detects the temperature of a semiconductor device (a semiconductor switching device or a recirculation diode), since a technique of mounting a temperature sensor on a semiconductor module that forms a power conversion apparatus such as an inverter, for example, is widely known, description thereof will not be provided. Moreover, since how the semiconductor temperature detecting/estimating unit 11 estimates the temperature of the semiconductor device is also known and disclosed in Patent Literature 1 and the like, description thereof will not be provided. Either one of a temperature detection method and a temperature estimation method may be used to obtain the temperature information of the semiconductor device.

In FIG. 1, although the inverter 2 includes six IGBTs and six recirculation diodes, the highest temperature of the temperatures of these twelve semiconductor devices may be output from the semiconductor temperature detecting/estimating unit 11 as the semiconductor temperature. As another method, the highest temperature of the temperatures of several semiconductor devices (for example, six IGBTs if it is predicted that the temperature of the IGBT will obviously become higher than that of the recirculation diode) among the twelve semiconductor devices may be output from the semiconductor temperature detecting/estimating unit 11 as the semiconductor temperature.

In FIG. 1, if the semiconductor temperature becomes higher than the preset temperature, the output of the regulating unit including the proportional regulator 13 and the integral regulator 14 becomes a negative value. On the other hand, if the semiconductor temperature becomes lower than the preset temperature, the output of the regulating unit becomes a positive value. Here, when the upper limit used by the torque correction amount limiting unit 16 provided at the output stage of the regulating unit is set to "0," the torque correction amount $\tau_{comp}^*$ limited by the torque correction amount limiting unit 16 does not exceed "0".

That is, when the semiconductor temperature becomes higher than the preset temperature, the original torque command $\tau^*$ is corrected and decreased by the negative torque correction amount $\tau_{comp}^*$ and is output as a final torque command $\tau^{**}$. Since a decrease in torque means a decrease in the current supplied from the inverter 2 to the electric motor 4, the generation loss of the semiconductor device decreases. That is, the operation of the regulating unit contributes only in the direction for decreasing the temperature of the semiconductor device. Moreover, when the regulating unit is formed of the proportional regulator 13, the integral regulator 14, and the like, the torque command can be adjusted automatically without decreasing the torque more than necessary regardless of an operating state of the apparatus, and the semiconductor device can be protected from overheating reliably.

Figure 2:
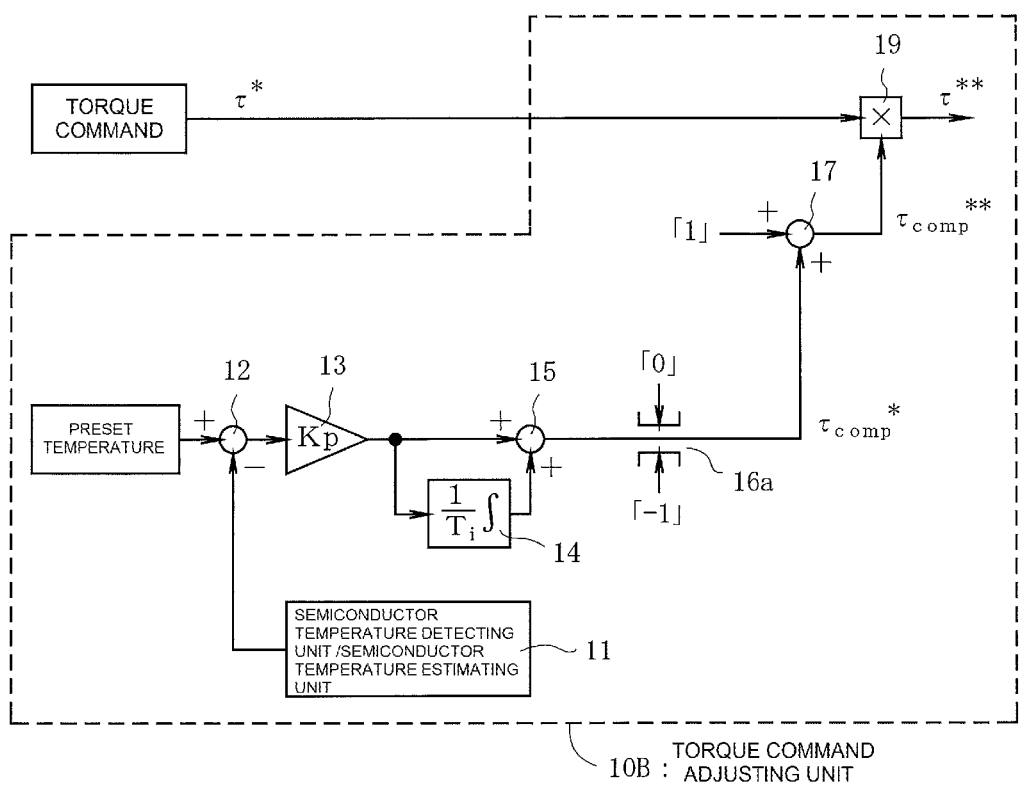
FIG. 2 is a block diagram illustrating a main part of a second embodiment of the present invention.

FIG. 2 is a block diagram illustrating a main part of a second embodiment of the present invention.

A difference from FIG. 1 is a method of torque command $\tau^*$ correction method in a torque command adjusting unit 10B. In the first embodiment of FIG. 1, the torque correction amount $\tau_{comp}^*$ is added to the torque command $\tau^*$ to obtain the final torque command $\tau^{**}$. In the second embodiment of FIG. 2, a multiplier 19 multiplies the torque command $\tau^*$ by a second torque correction amount $\tau_{comp}^{}$ to obtain the final torque command $\tau^{}$ and calculates a second torque correction amount $\tau_{comp}^{**}$ by adding the first torque correction amount $\tau_{comp}^*$ and "1".

That is, the torque correction amount $\tau_{comp}^*$ in FIG. 1 is a torque decrease amount whereas the second torque correction amount $\tau_{comp}^{**}$ in FIG. 2 is a torque decrease rate. Except this respect, a basic idea of FIG. 2 is the same as FIG. 1. That is, when the semiconductor temperature becomes higher than the preset temperature, an output signal (the first torque correction amount) $\tau_{comp}^*$ of the regulating unit including the proportional regulator 13, the integral regulator 14, and the like becomes negative. When the first torque correction amount $\tau_{comp}^*$ passes through the torque correction amount limiting unit 16a of which the upper limit is set to "0" and the lower limit is set to "−1," the torque correction amount $\tau_{comp}^*$ is limited to a value in the range of $0 < \tau_{comp}^* < -1$ and is input to the adder 17. Due to this, the second torque correction amount $\tau_{comp}^{}$ having a magnitude of $0 < \tau_{comp}^{} < 1$ is output from the adder 17. The multiplier 19 multiplies the torque correction amount $\tau_{comp}^{**}$ by the original torque command $\tau^*$ whereby a final torque command $\tau^{**}$ of which the magnitude is smaller than the torque command $\tau^*$ is output.

By setting the lower limit of the torque correction amount limiting unit 16a to "−1," it is possible to prevent the polarity of the final torque command $\tau^{**}$ from being reversed from the original torque command $\tau^*$.

Figure 3:
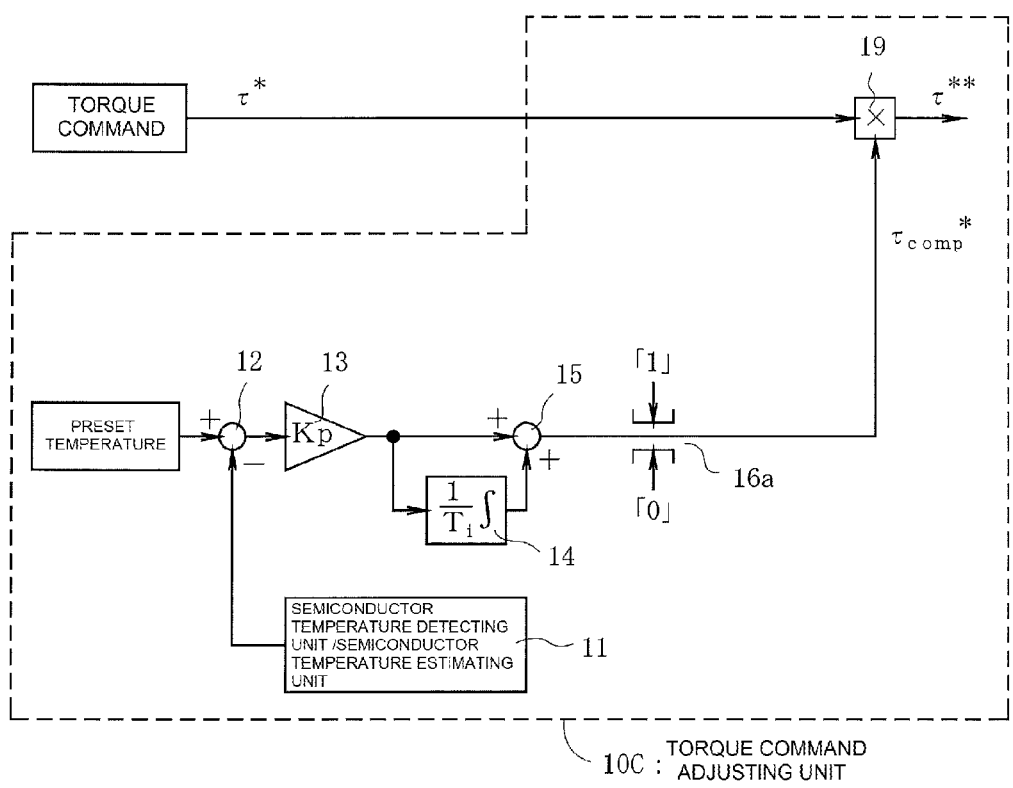
FIG. 3 is a block diagram illustrating a main part of a third embodiment of a present invention.

FIG. 3 is a block diagram illustrating a main part of a third embodiment of the present invention and corresponds to a modification of the second embodiment.

In a torque command adjusting unit 10C of this embodiment, the upper limit of the torque correction amount limiting unit 16a is set to "1" and the lower limit is set to "0". When the semiconductor temperature is lower than the preset temperature, since the deviation output from the subtractor 12 is positive, the integral regulator 14 integrates the positive value having passed through the proportional regulator 13 and the output (that is, the torque correction amount $\tau_{comp}^*$) of the regulating unit has a positive value. The torque correction amount $\tau_{comp}^*$ does not exceed "1" due to the operation of the torque correction amount limiting unit 16a. If the torque correction amount $\tau_{comp}^*$ is limited to "1," the original torque command $\tau^*$ becomes the final torque command $\tau^{**}$ as it is without the magnitude being decreased by the multiplier 19.

On the other hand, when the semiconductor temperature is higher than the preset temperature, since the deviation output from the subtractor 12 is negative and a negative value having passed through the proportional regulator 13 is input to the integral regulator 14, the torque correction amount $\tau_{comp}^*$ having passed through the torque correction amount limiting unit 16a is limited to a value smaller than "1". As a result, the magnitude of the original torque command $\tau^*$ is decreased by the multiplier 19 and the decreased torque command $\tau^*$ becomes the final torque command $\tau^{**}$.

Here, by setting the lower limit of the torque correction amount limiting unit 16a to "0," it is possible to prevent the polarity of the final torque command $\tau^{**}$ from being reversed from the original torque command $\tau^*$ similarly to the above.

Figure 4:
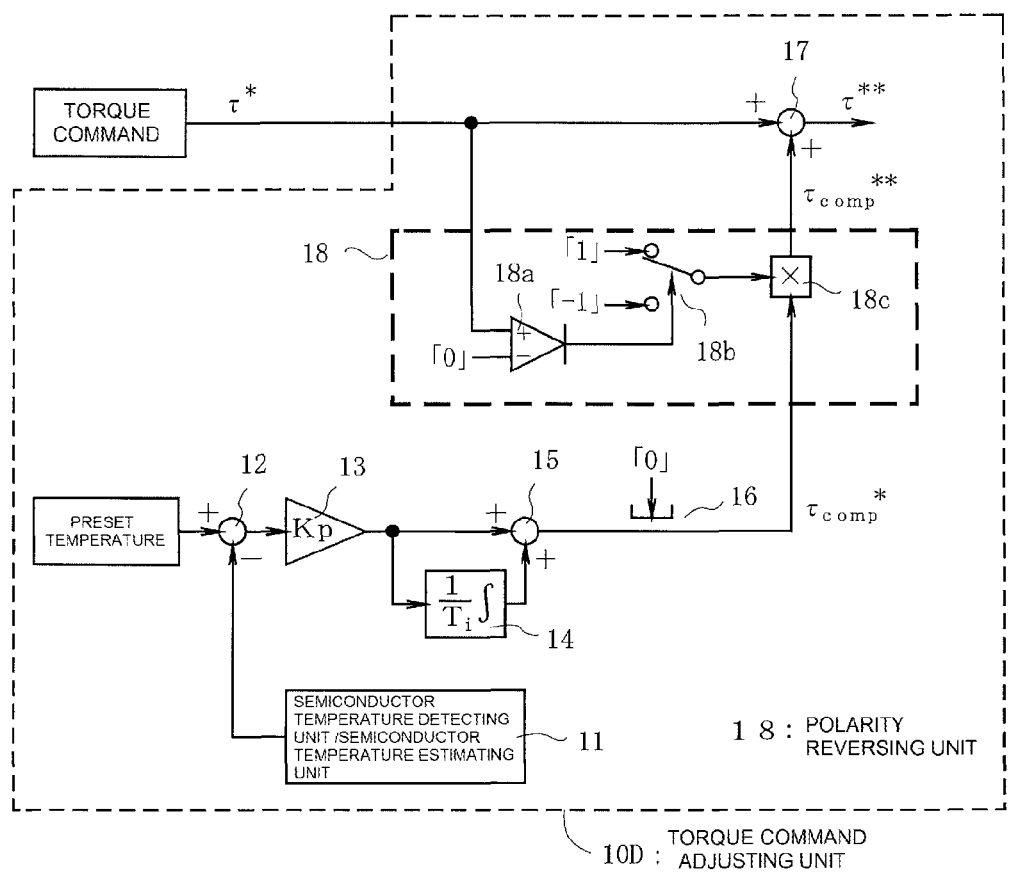
FIG. 4 is a block diagram illustrating a main part of a fourth embodiment of the present invention.

FIG. 4 is a block diagram illustrating a main part of a fourth embodiment of the present invention. This embodiment is different from that of FIG. 1 in that, in a torque command adjusting unit 10D, a polarity reversing unit 18 is provided between the torque correction amount limiting unit 16 and the adder 17. The polarity reversing unit 18 includes a comparator 18a that compares the polarity of the original torque command τ* with "0," a switch unit 18b that switches between "1" and "−1" according to an output of the comparator 18a, and a multiplier 18c that multiplies the output signal of the switch unit 18b by the first torque correction amount $\tau_{comp}$* calculate the second torque correction amount $\tau_{comp}$**.

In the first embodiment of FIG. 1, when the torque command τ* is positive (this torque command will be referred to as a driving torque command), the torque command τ* is decreased to obtain the final torque command τ**, whereby the semiconductor temperature decreases and overheat protection can be realized. On the other hand, when the torque command τ* is negative (this torque command will be referred to as a braking torque command), even when the torque command τ* is decreased, the braking torque command increases in a negative direction. As a result, the overheat protection function does not work and the temperature of the semiconductor device increases further.

Due to this, in the fourth embodiment, as illustrated in FIG. 4, the switch unit 18b switchably outputs "1" and "−1" according to the output of the comparator 18a and the polarity of the torque command τ* to the multiplier 18c, and the multiplier 18c adjusts the polarity of the first torque correction amount $\tau_{comp}$* to generate the second torque correction amount $\tau_{comp}$**.

That is, in FIG. 4, the switch unit 18b selects "1" when the torque command τ* is positive whereas the switch unit 18b selects "−1" when the torque command τ* is negative. By doing so, when the semiconductor temperature becomes higher than the preset temperature and the first torque correction amount $\tau_{comp}$* becomes negative, the negative second torque correction amount $\tau_{comp}$** (when the torque command τ* is positive) or the positive second torque correction amount $E_{comp}$** (when the torque command τ* is negative) is calculated according to the polarity of the torque command τ*. The calculated second torque correction amount $\tau_{comp}$** is added to the original torque command τ* to generate the final torque command τ**.

Due to this, during driving or braking of the electric motor 4, it is possible to realize the required overheat protection.

Figure 5:
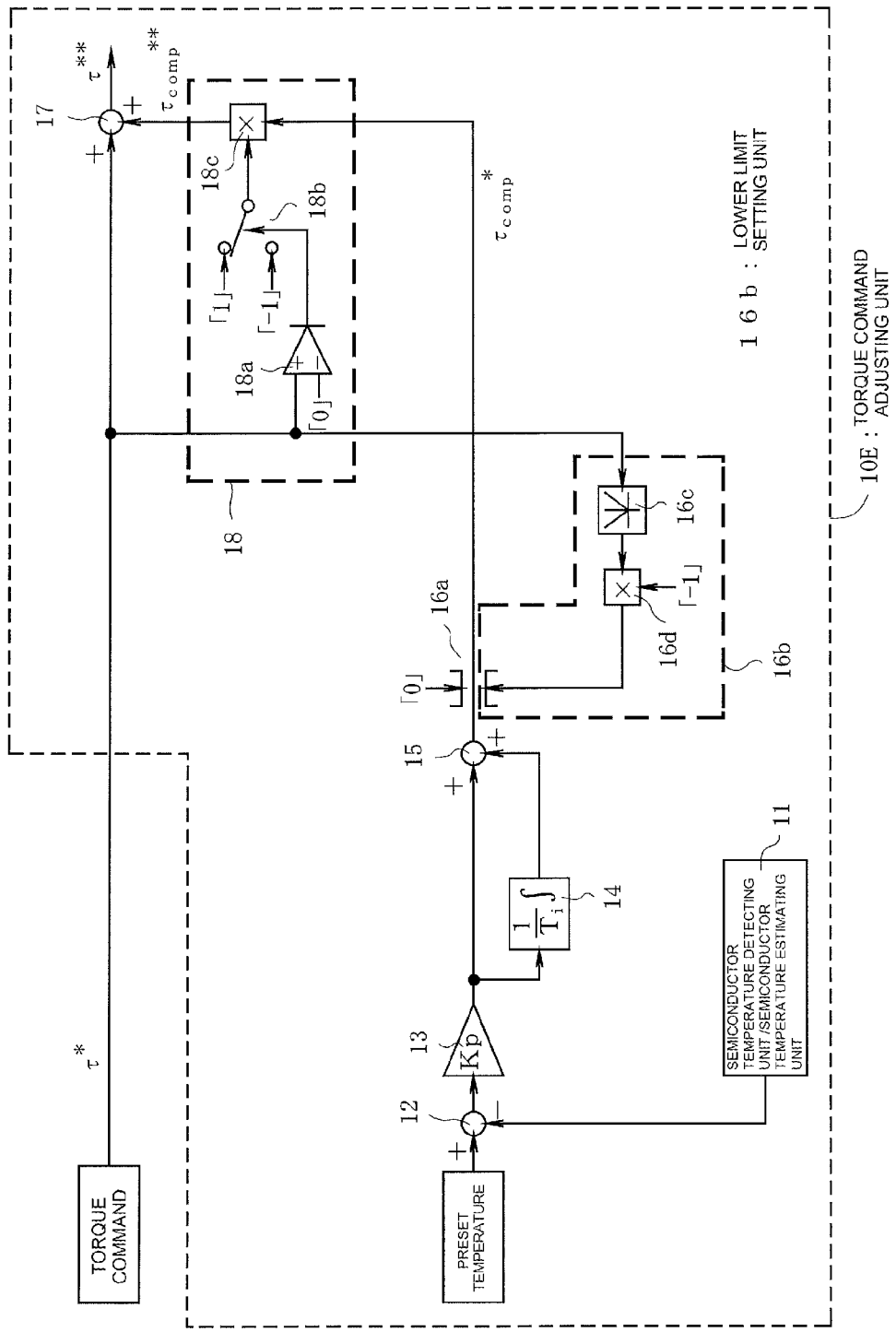
FIG. 5 is a block diagram illustrating a main part of a fifth embodiment of the present invention.

FIG. 5 is a block diagram illustrating a main part of a fifth embodiment of the present invention.

This embodiment is different from that of FIG. 4 in that, in a torque command adjusting unit 10E, a lower limit setting unit 16b sets the lower limit of the torque correction amount limiting unit 16a that limits the first torque correction amount $\tau_{comp}$*. The upper limit of the torque correction amount limiting unit 16a is set to "0," the original torque command τ* is input to an absolute value calculating unit 16c in the lower limit setting unit 16b, and a value obtained by a multiplier 16d multiplying the output of the absolute value calculating unit 16c by "−1" is the lower limit of the torque correction amount limiting unit 16a.

Next, the operation of this embodiment will be described in detail.

For example, in the embodiment of FIG. 4, a case in which a torque (a driving torque twice a reference value) that is +200% of a certain reference value is input as the torque command τ* and an overheat protection function works will be discussed. In the following description, "±X %" means a percentage to a reference value as above.

In this case, it is assumed that the regulating unit operates so that the semiconductor temperature does not exceed the preset temperature, the second torque correction amount $\tau_{comp}$ is decreased to −50%, and as a result, the final torque command τ is increased to +150% (=τ*+$\tau_{comp}$**=200%−50%).

In such a state, it is assumed that the original torque command τ* is decreased in a step manner from +200% to +20%.

In this case, since the regulating unit has operated so that the difference between the preset temperature and the semiconductor temperature is "0," the output of the integral regulator 14 is approximately −50% at the time point when the torque command τ* is decreased to +20%. Here, when the torque command τ* is decreased to +20%, since the output current of the inverter 2 decreases and the semiconductor temperature becomes lower than the preset temperature, the output of the subtractor 12 becomes positive. Due to this, a positive value is input to the integral regulator 14, and the output of the integral regulator 14 starts increasing toward a positive value from −50% due to the integration relaxation time of the integral regulator 14. That is, even when the original torque command τ* is decreased from +200% to +20% of the reference value, the semiconductor temperature becomes lower than the preset temperature, and it is not necessary to perform overheat protection, the output of the integral regulator 14 remains negative for a certain period. Thus, a period in which the first torque correction amount $\tau_{comp}$* which is the sum of the output of the proportional regulator 13 and the output of the integral regulator 14 is negative may be present.

Due to this, in the embodiment of FIG. 4, a case in which the torque command τ obtained by adding the negative second torque correction amount $\tau T_{comp}$ to the original torque command τ* decreased to +20% becomes negative and the electric motor 4 generates a braking torque may occur. Such a situation in which a braking torque is generated even when the original torque command τ* is positive (that is, the command indicates that the electric motor 4 has to generate a driving torque) may cause a problem sometimes although it depends on the specification of a facility or the like to which the power conversion apparatus such as the inverter 2 is applied.

In order to solve the problem, in a fifth embodiment of FIG. 5, the lower limit setting unit 16b sets the lower limit of the torque correction amount limiting unit 16a.

In the lower limit setting unit 16b, the absolute value calculating unit 16c calculates the absolute value of the torque command τ*, and a value obtained by the multiplier 16d multiplying the absolute value by "−1" is set as the lower limit of the first torque correction amount $\tau_{comp}$*. With this configuration, in the above-described example, when the original torque command τ* is decreased to +20%, the first torque correction amount $\tau_{comp}$* is limited to −20% by the lower limit. In this case, the second torque correction amount $\tau_{comp}$ having passed through the polarity reversing unit 18 is also −20% and the final torque command value τ obtained by adding the original torque command τ* and the torque correction amount $\tau_{comp}$** becomes 0. Thus, at least the driving torque may not be reverse to the braking torque.

The reason why the absolute value calculating unit 16c is provided in the lower limit setting unit 16b is to prevent the polarity of the torque command from being reversed when the original torque command τ* is negative (that is, the original torque command τ* is a braking torque) and the torque command τ* is corrected and to prevent the driving torque from being output.

Figure 6:
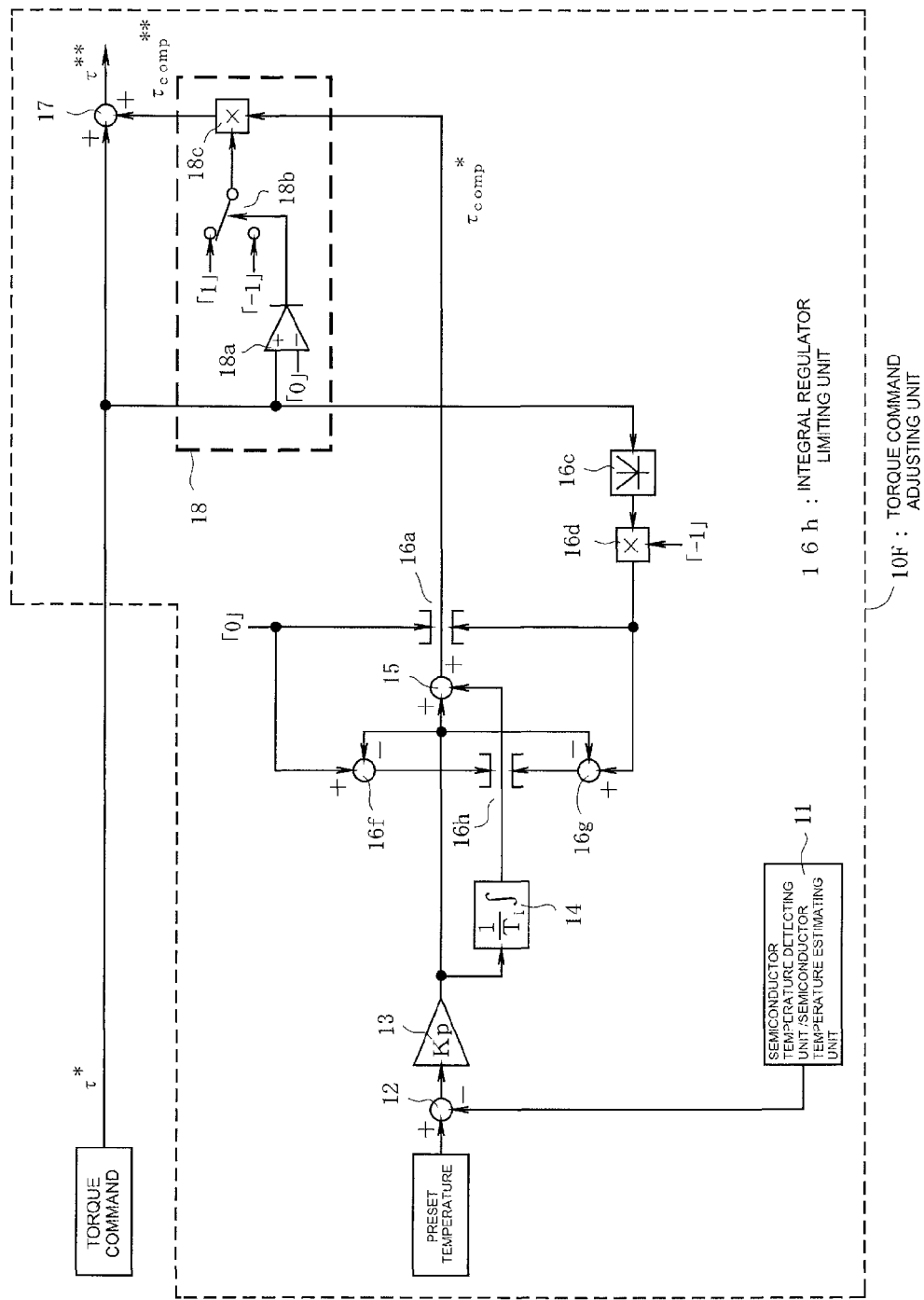
FIG. 6 is a block diagram illustrating a main part of a sixth embodiment of the present invention.

FIG. 6 is a block diagram illustrating a main part of a sixth embodiment of the present invention.

This embodiment is different from that of FIG. 5 in that an integral regulator limiting unit 16h that limits the output of the integral regulator 14 by upper and lower limits is provided in a torque command adjusting unit 10F.

In the embodiments of FIGS. 1 and 4, when the semiconductor temperature is lower than the preset temperature (that is, it is not necessary to perform the overheat protection function), since the output of the subtractor 12 becomes positive and the integral regulator 14 integrates a positive value, values up to a positive upper limit as allowed by the integral regulator 14 are stored. In such a situation, when overheat protection is necessary, the output of the integral regulator 14 is originally scheduled to become a negative value immediately. However, since a positive value is stored in the integral regulator 14, it takes a considerable time until the output becomes a negative value. Due to this, the responsiveness of the overheat protection function may deteriorate and in some cases, it is difficult to perform overheat protection quickly, which is a first problem.

Another problem will be described based on the example used in description of FIG. 5.

Since the first torque correction amount $\tau_{comp}^*$ is limited by the lower limit of the torque correction amount limiting unit 16a when the original torque command $\tau^*$ is decreased to +20% of the reference value, the value of the first torque correction amount $\tau_{comp}^*$ may not be smaller than −20%, and as a result, the corrected final torque command $\tau^{**}$ may not be smaller than "0". However, since the initial value of the output of the integral regulator 14 is negative (−50%), the first torque correction amount $\tau_{comp}^*$ (that is, the second torque correction amount $\tau_{comp}^{**}$) becomes a negative value and the original torque command $\tau^*$ may be corrected although it is not necessary to perform overheat protection.

Naturally, it is desirable to change the torque correction amount $\tau_{comp}^*$ to "0" quickly when it is not necessary to perform overheat protection. However, when the time point when the torque command $\tau^*$ is decreased to +20% is taken as a base point, the output of the integral regulator 14 gradually increases toward a positive value with the integration relaxation time from −50% as an initial value. Thus, it takes a considerable time for the torque correction amount $\tau_{comp}^*$ to become "0". That is, although a state in which it is not necessary to perform overheat protection is created, the original torque command $\tau^*$ is corrected for a long period of time, which is a second problem.

In order to solve the first and second problems, in a sixth embodiment, as illustrated in FIG. 6, an integral regulator limiting unit 16h that limits the output of the integral regulator 14 by upper and lower limits is provided in a torque command adjusting unit 10F. Moreover, as illustrated in the drawing, the upper limit and lower limit of the integral regulator limiting unit 16h are set to values obtained by subtracting the output of the proportional regulator 13 from the upper limit "0" and the lower limit of the torque correction amount limiting unit 16a, respectively.

Here, the sum of the output of the proportional regulator 13 and the output of the integral regulator 14 is the output of the regulating unit and the output of the regulating unit is limited by the torque correction amount limiting unit 16a. Thus, in a state in which the output of the regulating unit is limited by the torque correction amount limiting unit 16a, the following relation is satisfied.

Regulating unit output=Limit value of Torque correction amount limiting unit 16a=(Output of Proportional regulator 13)+(Output of Integral regulator 14).

This can be understood as follows.

Output of Integral regulator 14=(Limit value of Torque correction amount limiting unit 16a)−(Output of Proportional regulator 13)

Therefore, the upper and lower limits of the integral regulator limiting unit 16h can be understood as values obtained by subtracting the output of the proportional regulator 13 from the upper and lower limits of the torque correction amount limiting unit 16a, respectively, as illustrated in FIG. 6.

According to the sixth embodiment, the first problem is solved as follows. The output of the integral regulator 14 does not become a positive value when it is not necessary to perform overheat protection. Moreover, the output of the regulating unit which is the sum of the output of the proportional regulator 13 and the output of the integral regulator 14 becomes "0," and the output of the integral regulator 14 is maintained suitably. Thus, the responsiveness of the overheat protection function can be improved.

The second problem is solved as follows. In the above-described example, the initial value of the output of the integral regulator 14 is decreased to −50% when the torque command $\tau^*$ is decreased from +200% to +20%. However, in the sixth embodiment, the output of the integral regulator 14 is limited to −20% if the output of the proportional regulator 13 is "0". That is, when the time point when the torque command $\tau^*$ is decreased to +20% is taken as a base point, the output of the integral regulator 14 gradually increases toward a positive value with the integration relaxation time from −20% as an initial value. Thus, it is possible to shorten the period in which the torque command $\tau^*$ is corrected when a state in which it is not necessary to perform overheat protection is created.

Figure 7:
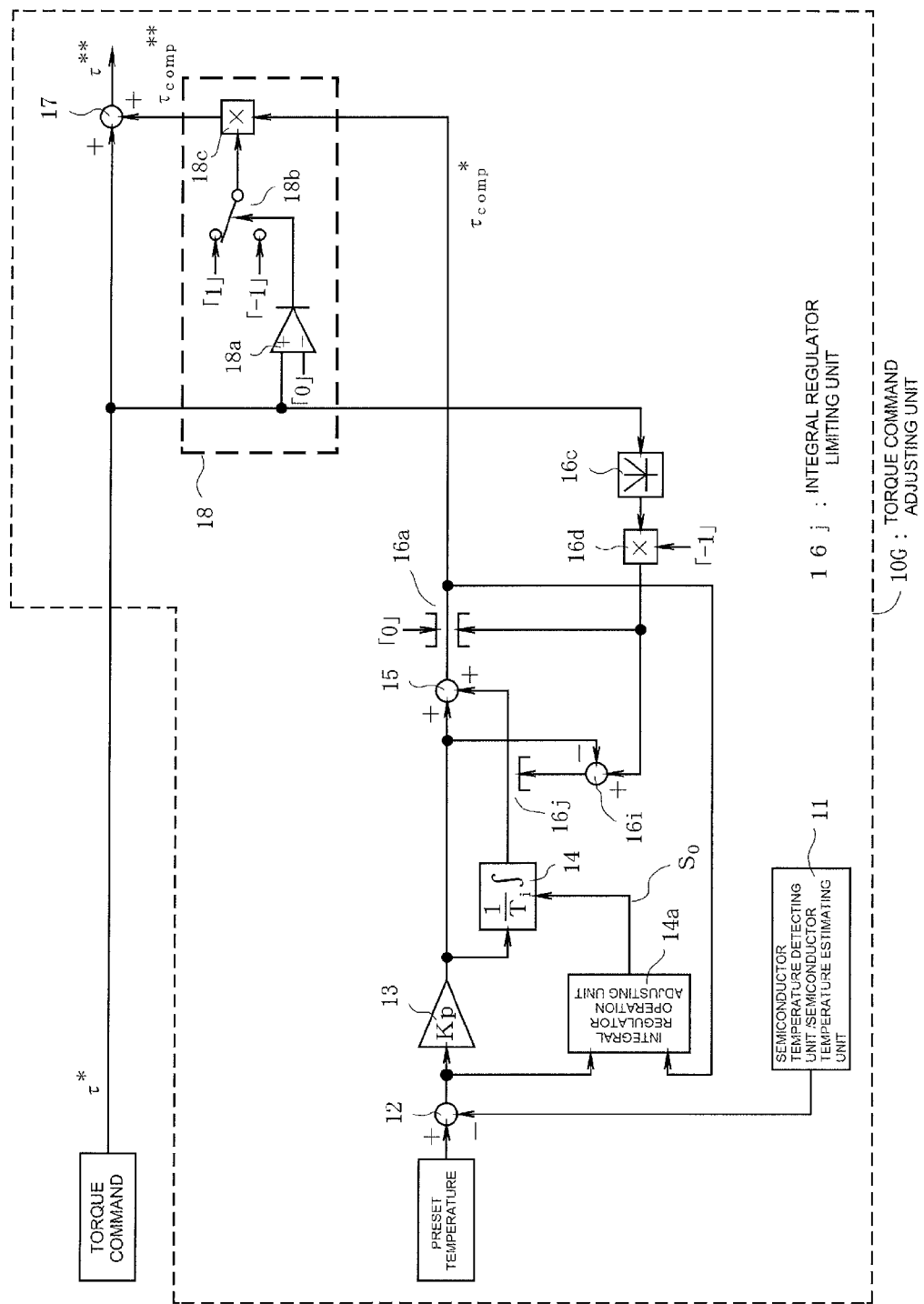
FIG. 7 is a block diagram illustrating a main part of a seventh embodiment of the present invention.

FIG. 7 is a block diagram illustrating a main part of a seventh embodiment of the present invention.

According to this embodiment, in a torque command adjusting unit 10G, an integral regulator operation adjusting unit 14a, to which the output of the subtractor 12 and the output (the first torque correction amount $\tau_{comp}^*$) of the torque correction amount limiting unit 16a are input, is further provided, unlike the torque command adjusting unit in FIG. 6. The feature in this embodiment differs from the previous embodiment in that the operation of the integral regulator 14 is controlled (allowed or stopped) according to an output signal $S_0$ of the operation adjusting unit 14a and that only a lower limit is set to an integral regulator limiting unit 16j that limits the output of the integral regulator 14 (that is, the upper limit is not removed). When the operation of the integral regulator 14 is stopped according to the signal $S_0$, the output of the integral regulator 14 is cleared to zero.

In FIG. 6, a state in which the semiconductor temperature is lower than the preset temperature and the overheat protection is not necessary will be considered. In this case, a positive value ($K_p$×(temperature deviation), where (temperature deviation)=(preset temperature)−(semiconductor temperature)) obtained by multiplying a deviation between the preset temperature and the semiconductor temperature by a proportional gain $K_p$ is output from the proportional regulator 13.

On the other hand, the output of the integral regulator 14 is limited so that the output of the regulating unit, which is obtained by an addition of the output of the proportional regulator 13 and the output of the integral regulator 14 becomes "0". Moreover, the output of the integral regulator 14 is limited by a value (that is, −$K_p$×(temperature deviation)) obtained by subtracting the output ($K_p$×(temperature deviation)) of the proportional regulator 13 from the upper limit "0" of the torque correction amount limiting unit 16a. That is, since the output of the proportional regulator 13 cancels the output of the integral regulator 14, the output (torque correction amount $\tau_{comp}*$) of the regulating unit becomes "0," and torque correction is not performed.

Here, a case in which high-frequency noise components are superimposed on the semiconductor temperature will be considered.

In this case, the DC components of the deviation between the preset temperature and the semiconductor temperature (that is, the DC components of the outputs of the proportional regulator 13 and the integral regulator 14) cancel each other as described above. Thus, the output of the regulating unit becomes "0" and no problem occurs.

On the other hand, since the phase of the output of the integral regulator 14 is offset from the phase of the output of the proportional regulator 13 with the integration operation, it is not possible to cancel high-frequency noise components. Due to this, the torque command $\tau*$ may be modulated with high frequencies although the semiconductor temperature on which noise is superimposed is lower than the preset temperature. A high-frequency variation in the torque command $\tau*$ may obviously cause a high-frequency torque pulsation in the electric motor 4 driven by the inverter 2 and may have an adverse effect on mechanical loads connected to the electric motor 4.

In this case, although the noise may be reduced by passing the semiconductor temperature through a filter, the use of a filter may deteriorate the responsiveness of the overheat protection and may decrease the reliability of the overheat protection.

Thus, in the seventh embodiment illustrated in FIG. 7, the integral regulator operation adjusting unit 14a is provided so as to allow or stop the operation of the integral regulator 14 using the output signal $S_0$ thereof and clear the output of the integral regulator 14 to zero when the integral regulator 14 is to be stopped.

The deviation between the preset temperature and the semiconductor temperature and the first torque correction amount $\tau_{comp}*$ are input to the integral regulator operation adjusting unit 14a. The integral regulator operation adjusting unit 14a performs a process of allowing and stopping the operation of the integral regulator 14 and clearing the output of the integral regulator 14 to zero according to the flow illustrated in FIG. 8.

Figure 8:
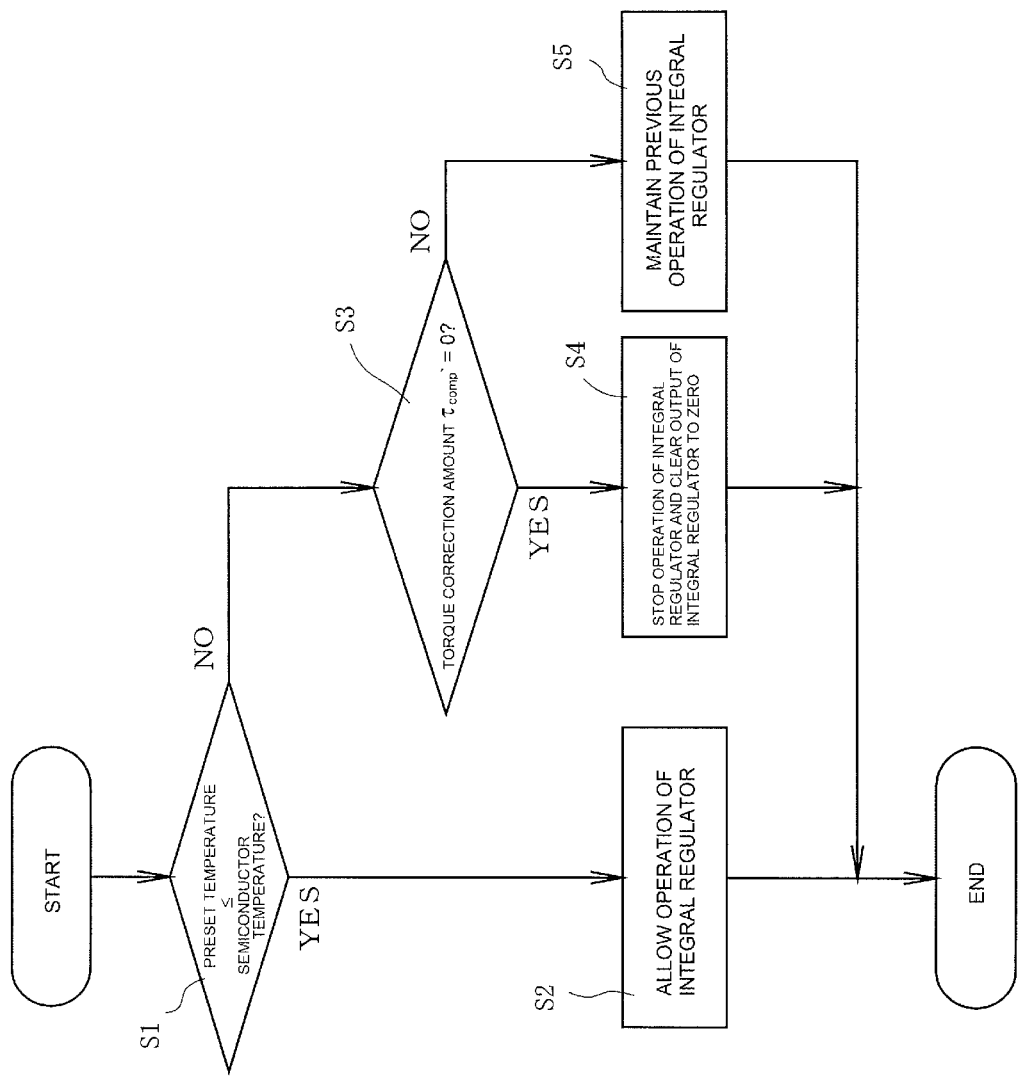
FIG. 8 is a flowchart illustrating an operation of the seventh embodiment of the present invention.
Figure 9:
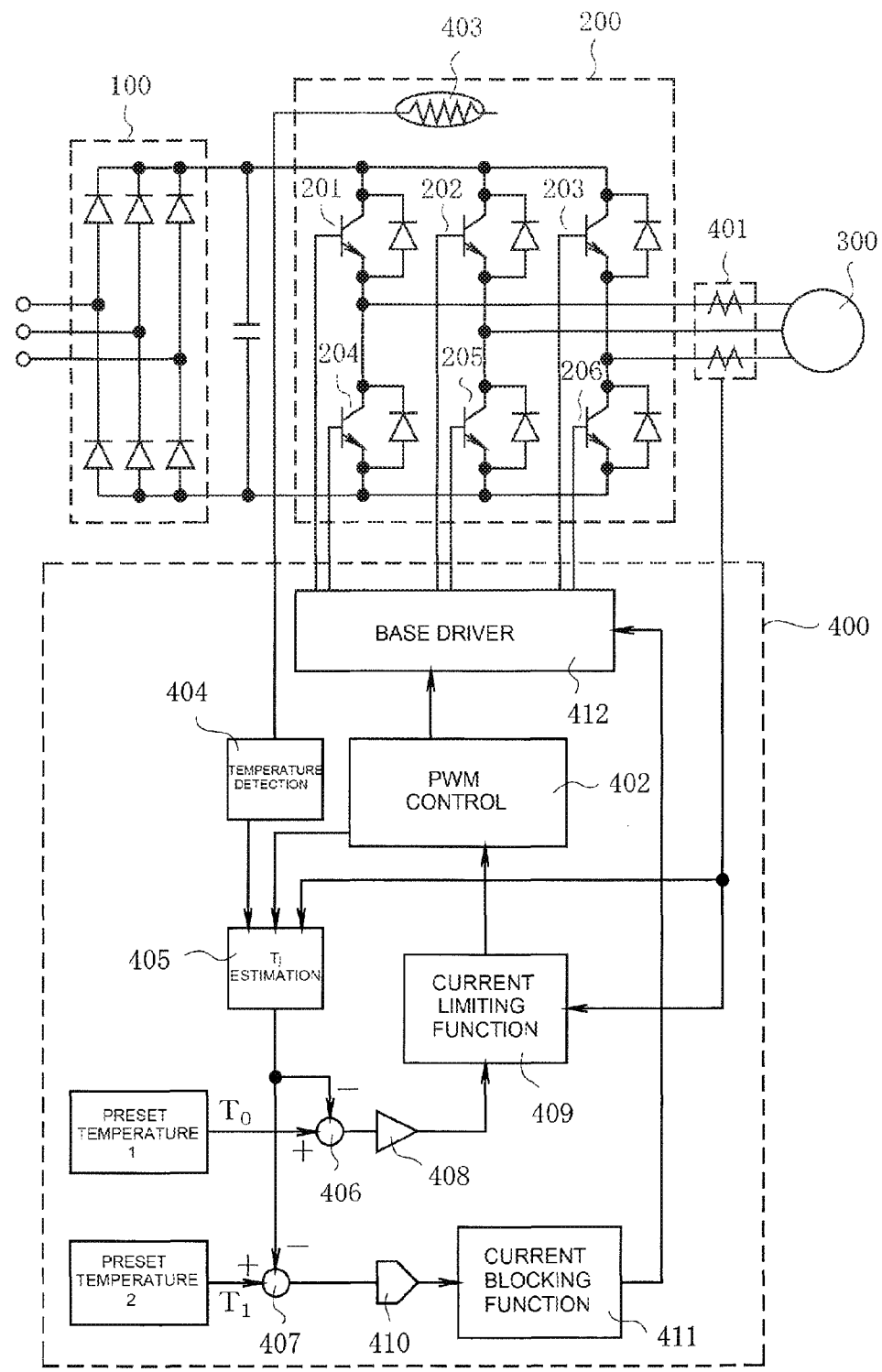
FIG. 9 is a block diagram associated with overheat protection of a semiconductor device disclosed in Patent Literature 1.
Figure 10:
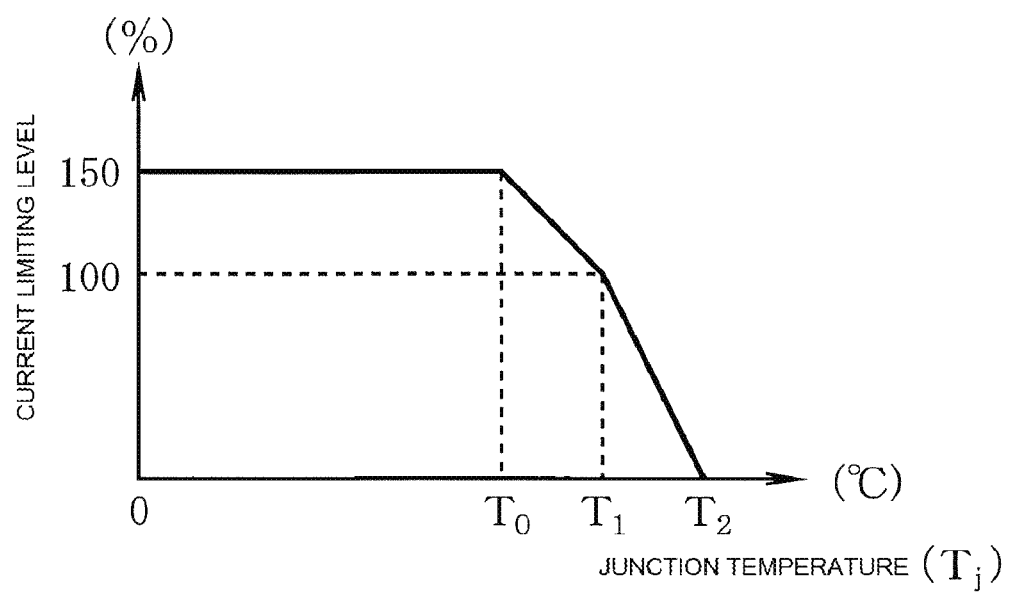
FIG. 10 is a diagram for describing the operation of FIG. 9.
Figure 11:
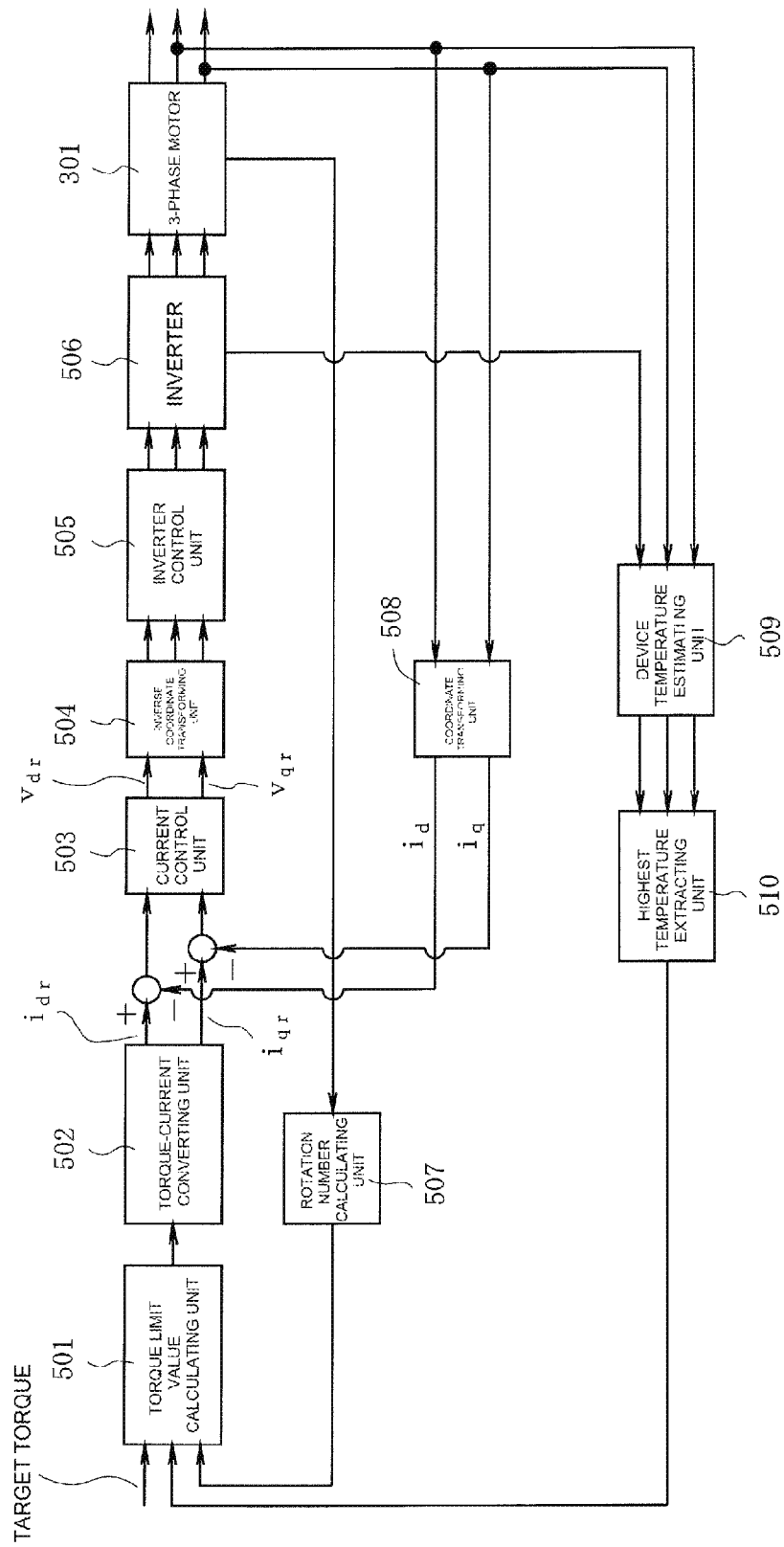
FIG. 11 is a block diagram associated with overheat protection of a semiconductor device disclosed in Patent Literature 2.
Figure 12:
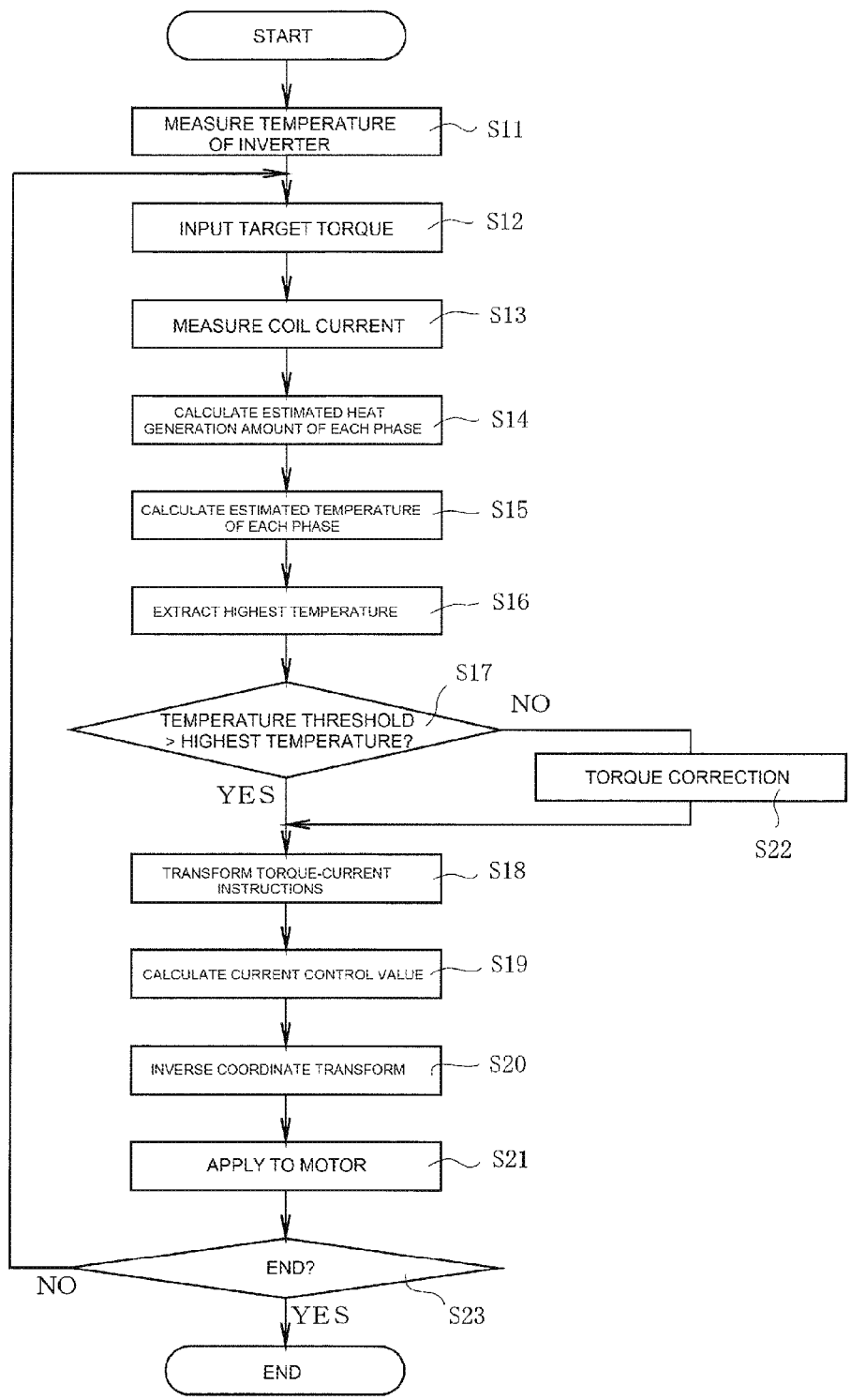
FIG. 12 is a flowchart for describing the operation of FIG. 11.
Figure 13:
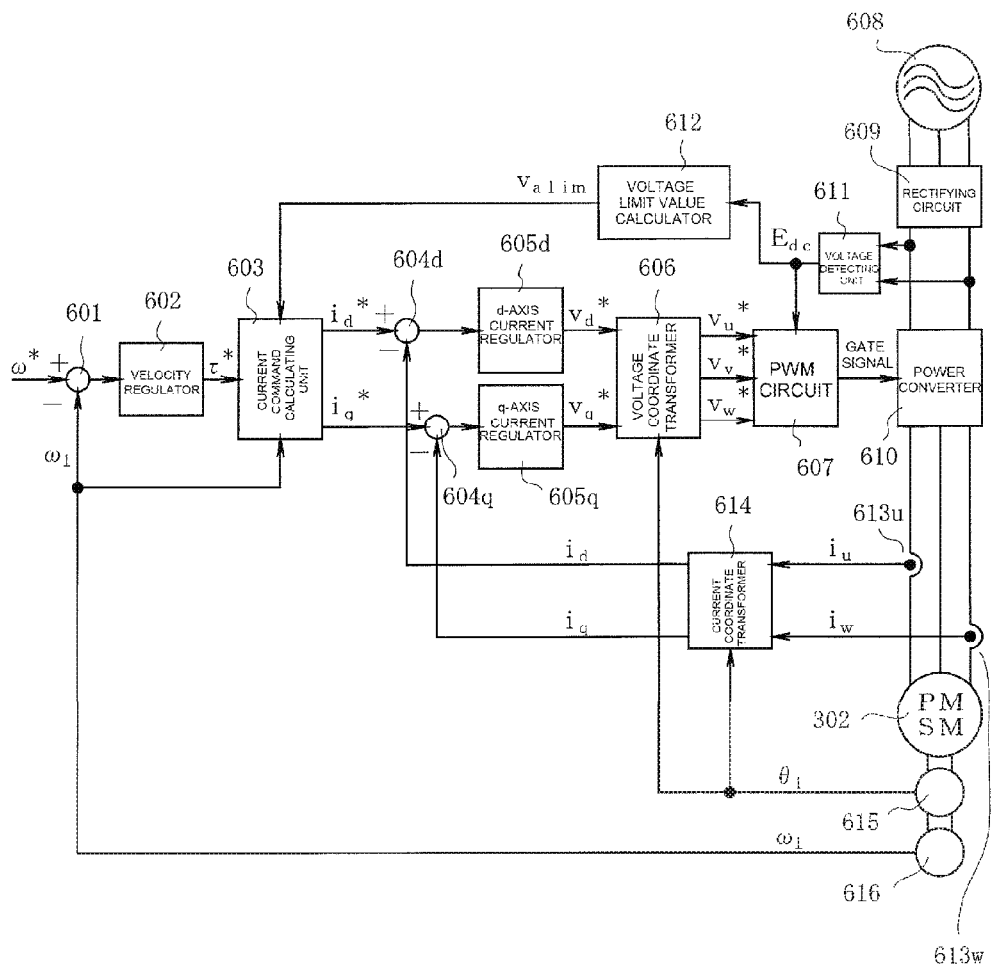
FIG. 13 is a control block diagram of a permanent magnet synchronous electric motor disclosed in Patent Literature 3.
Figure 14:
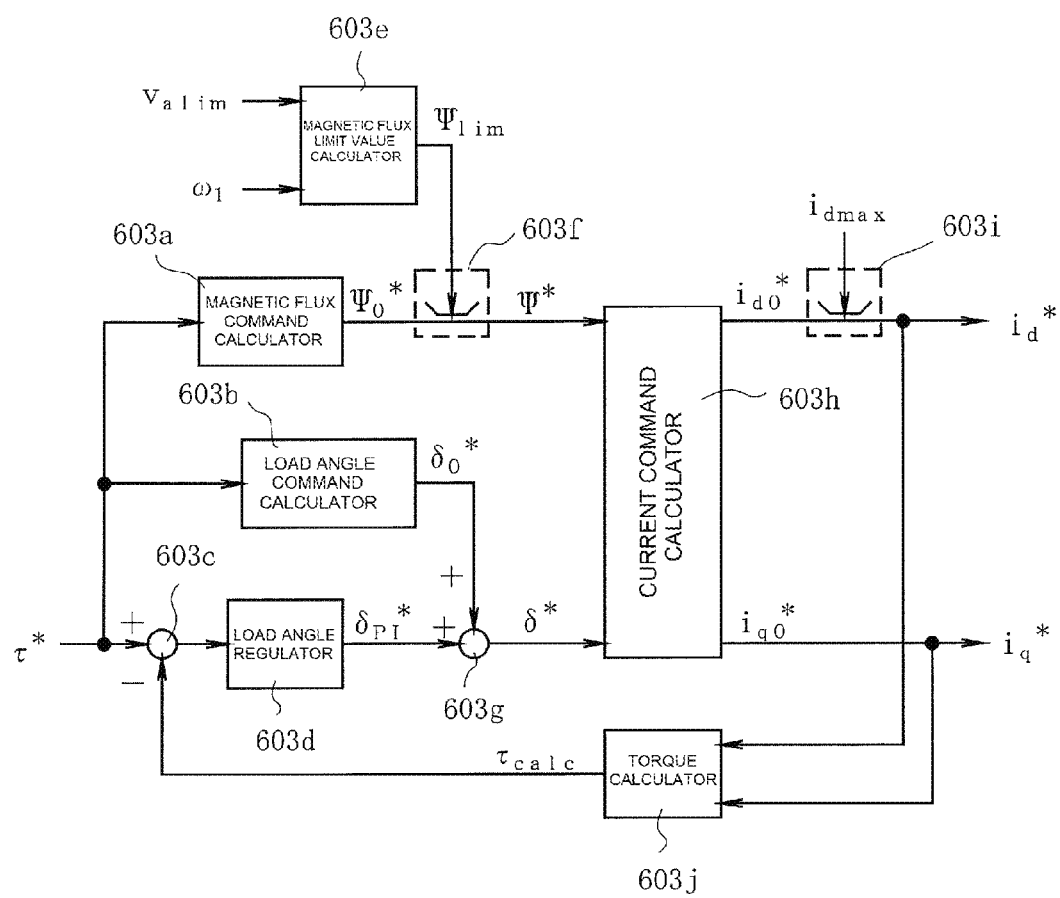
FIG. 14 is a block diagram of a current command calculating unit in FIG. 13.
Figure 15:
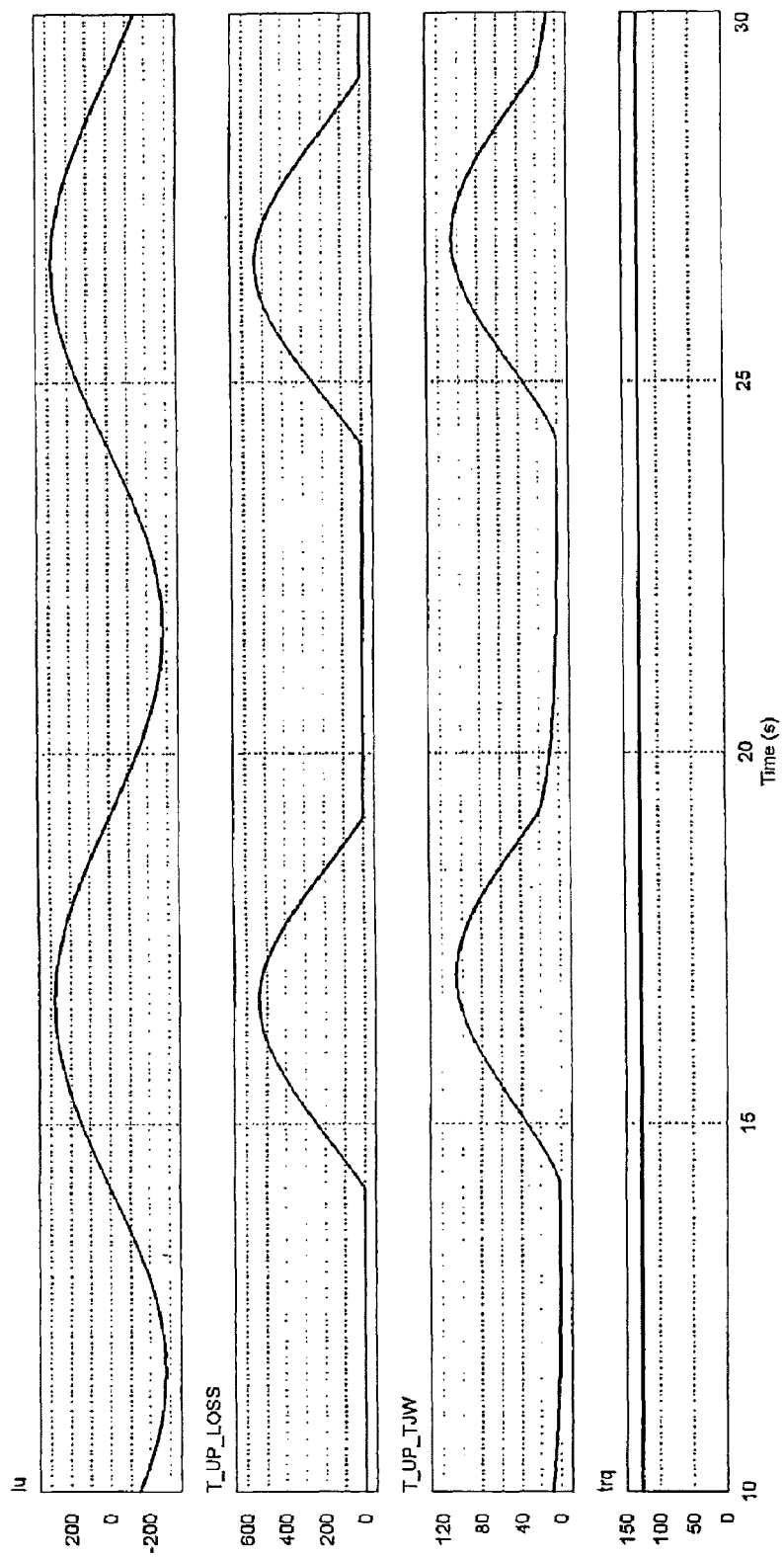
FIG. 15 is a diagram illustrating a simulation result of a temperature rise value and the like of a semiconductor device in relation to a coolant.
Figure 16:
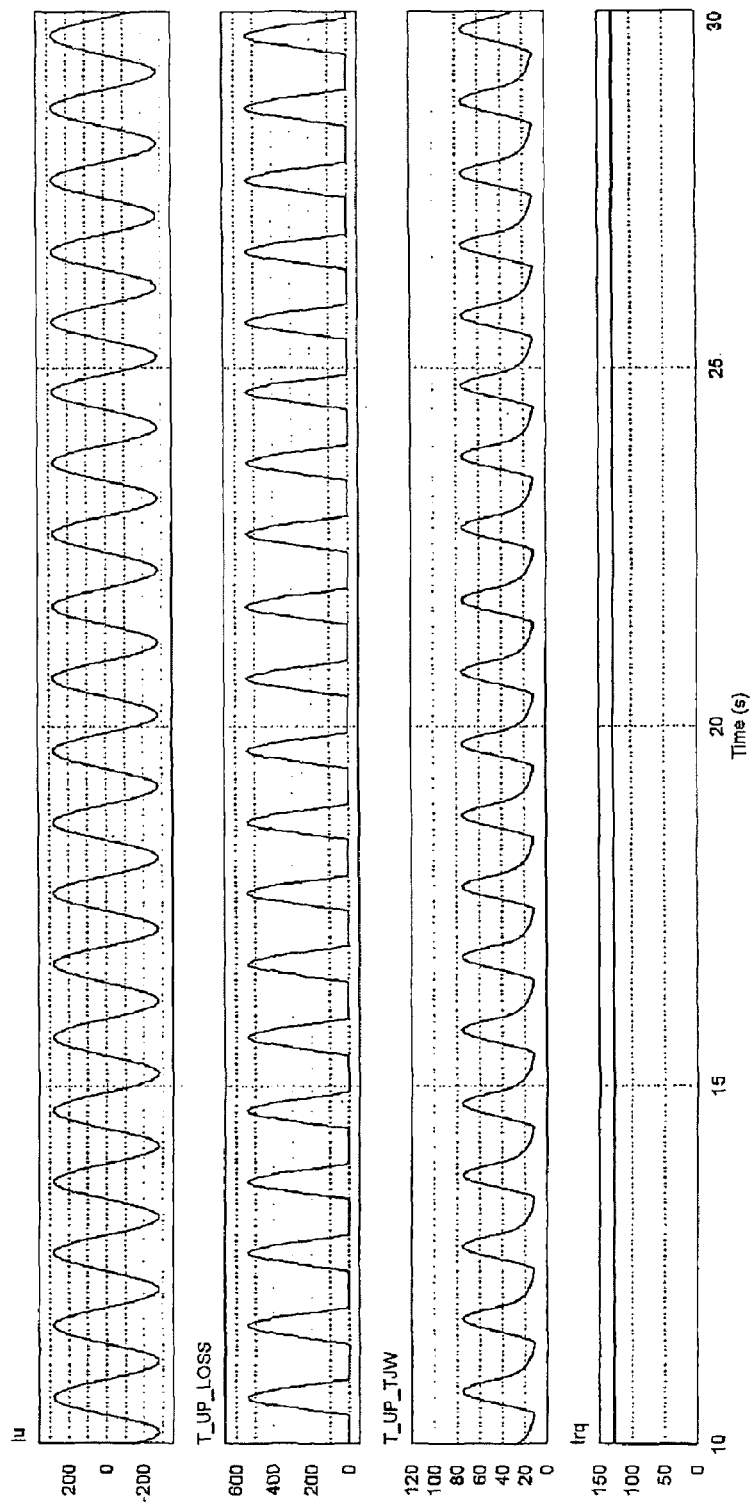
FIG. 16 is a diagram illustrating a simulation result of a temperature rise value and the like of a semiconductor device in relation to a coolant.

That is, as illustrated in FIG. 8, when the semiconductor temperature is equal to or higher than the preset temperature (step S1: YES), the operation of the integral regulator 14 is allowed (S2). When the semiconductor temperature is lower than the preset temperature (step S1: NO) and the torque correction amount $\tau_{comp}*$ is "0" (step S3: YES), the operation of the integral regulator 14 is stopped and the output thereof is cleared to zero (step S4). When the torque correction amount $\tau_{comp}*$ is not "0" (step S3: NO), the previous operation of the integral regulator 14 is maintained (step S5).

With these operations, the problem, which may occur when high-frequency noise components are superimposed on the semiconductor temperature, can be solved as described above. When it is determined that the operation of the integral regulator 14 is to be stopped, the output of the integral regulator 14 is cleared to zero. Thus, it is not necessary to perform such an upper limiting process as performed by the integral regulator limiting unit 16h of FIG. 6.

A second preset temperature higher than the preset temperature described in the first to seventh embodiments may be provided. A unit that stops the operation of the power conversion apparatus when the semiconductor temperature exceeds the second preset temperature may be provided. In this case, the second preset temperature is set to be equal to or lower than an absolute maximum rated temperature of a semiconductor device. By doing so, even if the power conversion apparatus falls into a state where it is unable to perform overheat protection in the first to seventh embodiments, the power conversion apparatus stops operating when the semiconductor temperature reaches the second preset temperature. Thus, overheat protection can be performed more reliably.

INDUSTRIAL APPLICABILITY

The present invention is directed to various power conversion apparatuses having a power semiconductor device such as a semiconductor switching device or a recirculation diode and can be used for overheat protection of the semiconductor devices and the power conversion apparatuses.

The invention claimed is:

1. A power conversion apparatus for driving an electric motor, comprising: a power semiconductor device;
   a control device configured to control the power semiconductor device based on a torque command of the electric motor;
   a semiconductor temperature detector/estimator configured to detect or estimate a temperature of the power semiconductor device; and
   a torque command adjusting device configured to adjust the torque command, and including
   a proportional regulator configured to apply a proportional gain to a difference between the detected or estimated temperature value and a preset temperature,
   an integral regulator configured to integrate an output of the proportional regulator,
   a torque correction amount limiting device configured to generate a limited torque correction amount using the output of the proportional regulator and an output of the integral regulator, for adjusting the torque command by the limited torque correction amount,
   an adder configured to add the limited torque correction amount to the torque command, and
   a polarity reversing device configured to reverse a polarity of the limited torque correction amount according to a polarity of the torque command.

2. The power conversion apparatus according to claim 1, wherein the torque command adjusting device further includes a lower limit setting device configured to set a lower limit of an output of the torque correction amount limiting device, using an absolute value of the torque command.

3. The power conversion apparatus according to claim 2, wherein the torque command adjusting device further includes:
   an integral regulator limiting device configured to limit the output of the integral regulator; and
   an integral regulator operation adjusting device configured to allow or stop an operation of the integral regulator, based on the difference between the preset temperature and the detected or estimated temperature value, and the output of the torque correction amount limiting device, wherein
   a lower limit of an output of the integral regulator limiting device is set to a difference between a lower limit of the output of the torque correction amount limiting device and the output of the proportional regulator, and the integral regulator operation adjusting device is configured to continue the operation of the integral regulator except to
- allow the operation of the integral regulator when the detected or estimated temperature value is equal to or higher than the preset temperature, and
- stop the operation of the integral regulator, and clear the output of the integral regulator to zero, when the detected or estimated temperature value is lower than the preset temperature and the limited torque correction amount does not decrease the absolute value of the torque command.

4. A method for a power conversion apparatus to drive an electric motor using a power semiconductor device, comprising:
- detecting or estimating a temperature of the power semiconductor device to thereby obtain a detected or estimated temperature value;
- adjusting a torque command of the electric motor, by applying a proportional gain to a difference between the detected or estimated temperature value and a preset temperature,
- integrating an output of the proportional regulator,
- generating a limited torque correction amount using the output of the proportional regulator and an output of the integral regulator, and
- adjusting the torque command by the limited torque correction amount; and controlling the power semiconductor device using the adjusted torque command,
- wherein the adjusting the torque command includes reversing a polarity of the limited torque correction amount according to a polarity of the torque command.

* * * * *